Figure 1:
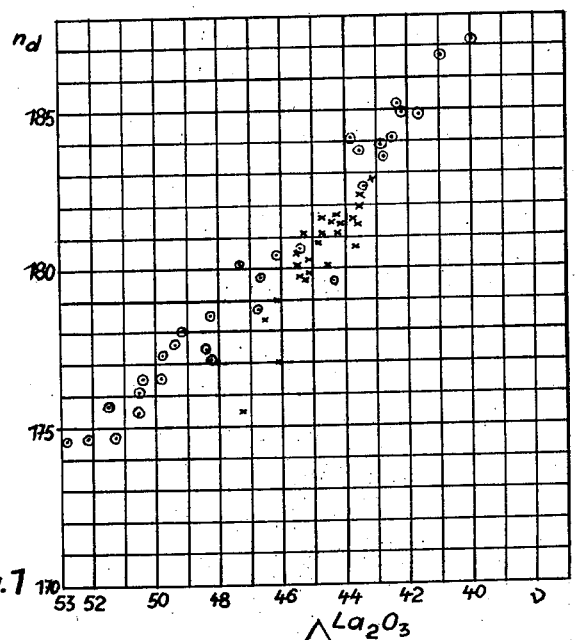

March 5, 1963  W. GEFFCKEN ETAL  3,080,240
OPTICAL GLASS FREE OF THORIUM
Filed July 27, 1959                           2 Sheets-Sheet 1

INVENTORS:
WALTER GEFFCKEN and MARGA FAULSTICH
By Burgess, Dinklage & Sprung
ATTORNEYS

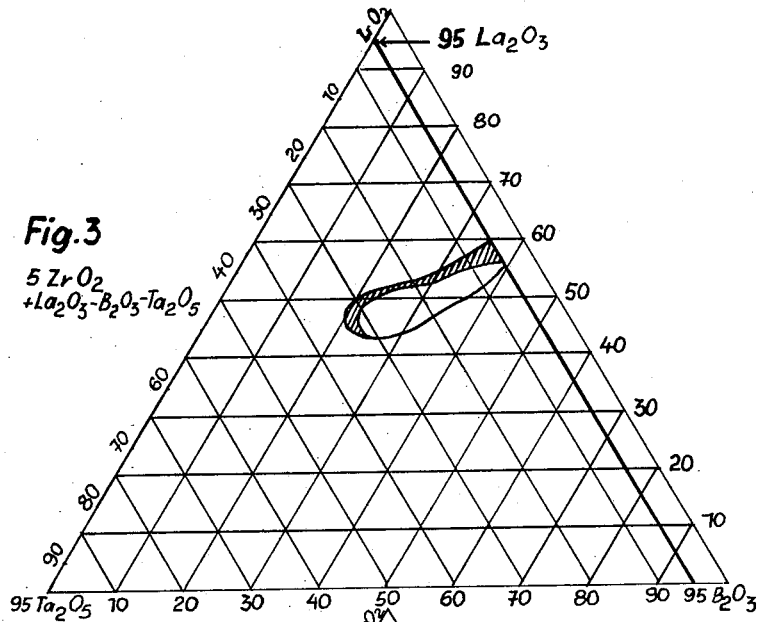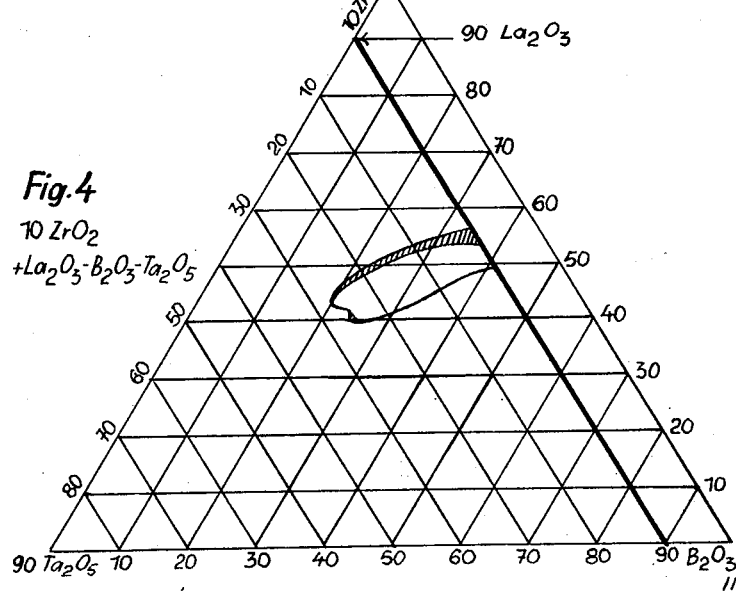

United States Patent Office 3,080,240
Patented Mar. 5, 1963

3,080,240
OPTICAL GLASS FREE OF THORIUM
Walter Geffcken and Marga Faulstich, Mainz, Germany, assignors to Jenaer Glaswerk Schott & Gen., Mainz, Germany, a corporation of Germany
Filed July 27, 1959, Ser. No. 829,722
Claims priority, application Germany Aug. 26, 1958
5 Claims. (Cl. 106—47)

The present invention relates to optical glass compositions which are free of thorium.

Prior to this invention, there has been a disclosure of glass compositions which substantially consist of $La_2O_3$, $Ta_2O_5$, $ZrO_2$, and $B_2O_3$, are free of thorium, and are also intended to contain bivalent oxides and $WO_3$.

The limits of these known glass compositions in percentages by weight were disclosed to be as follows:

|  | Percent |
|---|---|
| $B_2O_3$ | 22 to 37 |
| $La_2O_3$ | 25 to 40 |
| $Ta_2O_5$ | 10 to 21 |
| $ZrO_2$ | 2 to 7 |
| $WO_3$ | 0 to 20 |
| BaO | 0 to 20 |
| ZnO | 0 to 6 |
| $SiO_2$ | 0 to 6 | wherein $La_2O_3+Ta_2O_5+ZrO_2+BaO(+ZnO-WO_3)=50$ to 70% by weight.

In an example of an optical position of $n_d=1.78$, the upper limit of the refraction was given as $\nu=44.7$. However, it may be proved that such a composition in which the $La_2O_3$ amounts to a maximum of 40% does not result in a usable glass if the BaO and ZnO are omitted or if the $WO_3$ does not amount to at least 12%. It is therefore necessary to add bivalent oxides or larger amounts of $WO_3$.

In another prior patent relating to the production of a highly refractive glass, there have also been glass compositions proposed which consist of the oxides of the alkaline earth metals, namely, of $La_2O_3$, $Ta_2O_5$, $ZrO_2$, and $WO_3$, and therefore correspond in this respect to the above mentioned compositions, but differ therefrom by the requirement that the total of the percentages by weight of $La_2O_3+Ta_2O_5+BaO+ZnO$ should be greater than 70%, which means that the content in $B_2O_3$+possibly $SiO_2+Al_2O_3$ must be smaller than 30% by weight. Consequently, the refractive indices attained must be higher and extend up to 1.83. A closer examination will show, however, that the glass compositions with a $B_2O_3$ content of less than 27% by weight or with an $n_d$-value of more than 1.805 can no longer be regarded as stable. A characteristic of these compositions is a certain content of alkaline earth oxide or lithium oxide, and generally of CaO which in all of the examples disclosed is present in amounts of at least 20% of the boric acid content in accordance with a molar ratio of CaO to $B_2O_3$ of at least 0.216. It is a well known fact that the glass range of pure lanthanum borate, which only exists in the immediate vicinity of the composition $La_2O_3=60$ and $$B_2O_3=40$$

is considerably enlarged by such a content in alkaline earths relative to boric acid.

According to the present invention it has been unexpectedly found that a content of bivalent ions or of $WO_3$ may be completely avoided, that completely stable glass compositions may be produced merely from $B_2O_3$, $La_2O_3$, and at least 4% by weight of $ZrO_2$, and/or $Ta_2O_5$, and that the optical position of these glass compositions exceeds even the above mentioned types, provided the individual constituents are provided in percentages by weight as follows:

|  | Percent |
|---|---|
| $B_2O_3$ | 20 to 40 |
| $Ta_2O_5$ | 0 to 30 |
| $ZrO_2$ | 0 to 12 | and provided the lanthanum oxide content has an absolute lower limit of 44–0.04 ($ZrO_2$) percent by weight and an absolute upper limit of 60% by weight, and that it also lies between narrower limits dependent upon the boric acid and zirconium contents which limits are determined by the values given in the following Table I:

Table I

| $ZrO_2$, percent by wt. | $B_2O_3$ | | | | | | | |
|---|---|---|---|---|---|---|---|---|
|  | 40 | 37 | 33.5 | 30.5 | 27.5 | 25.0 | 22.5 | 20.0 |
| 0 |  | 55.0–58.0 | 51.5–56.5 | 45.0–55.0 | 44.0–54.0 | 45.0–53.0 | 46.5–51.5 | 50 |
| 5 |  | 51.5–58.0 | 48.0–56.5 | 43.5–54.0 | 42.5–52.5 | 44.0–52.0 | 45.5–51.5 | 50 |
| 10 | 50 | 48.5–53.0 | 45.0–56.5 | 41.5–55.3 | 40.0–52.5 | 40.0–51.0 | 42.0–49.0 | 44–45 |

In order to attain intermediate values, they should be graphically interpolated in the above table. The $Ta_2O_5$ content will then lie likewise between two limits which are dependent upon the desired refraction of the glass in accordance with the following Table II:

Table II

| $ZrO_2$, percent by wt. | $n_d=$ | | | | | | | |
|---|---|---|---|---|---|---|---|---|
|  | 1.74 | 1.76 | 1.78 | 1.80 | 1.82 | 1.84 | 1.82 | 1.80 |
| 0 | 4.5–7 | 6.0–9.0 | 13.0–22.0 | 17.0–27.0 | 21.0–29.0 | 25.0–30.5 | 29.0–31.0 |  |
| 5 |  | 2.0–9.0 | 7.0–14.0 | 11.5–21.5 | 15.5–25.5 | 19.0–27.0 | 23.5–27.0 |  |
| 10 |  | 0–4.0 | 0–10.0 | 4.5–17.5 | 9.0–21.5 | 14.0–25.0 | 21.0–26.0 | 27.0 |

According to the formula given above, in which ($ZrO_2$) is intended to indicate the percentage of $ZrO_2$ by weight, the absolute lower limit of the lanthanum oxide content will at 0% of $ZrO_2$ amount to 44%, while at 5% of $ZrO_2$ it decreases to 43%, and at 7% of $ZrO_3$ to 42%. The absolute lower limit of the $La_2O_3$ content will decrease to 40% not until the $ZrO_2$ content amounts to 10%. The existence of such a lower limit is surprising particularly in view of the fact that it could, on the contrary, be assumed that an increase of the lanthanum oxide content would result in a decrease in the stability. This is true especially since the prior art as stated in the begining expressly indicated the value of the upper limit of La₂O₃ to amount to 40% by weight and since it also restricted the ZrO₂ content to 7% by weight. The glass compositions prepared according to this prior proposal therefore have an La₂O₃ content which lies below the absolute lower limit and therefore require for their stabilization a content in bivalent oxides or WO₃ which leads to a considerable impairment of the optical position and, especially if greater amounts of WO₃ are applied, to a strong yellow discoloration.

These and other features and advantages of the present invention as compared with the state of the prior art will now be described in detail with reference to the accompanying drawings, in which—

Figure 2:
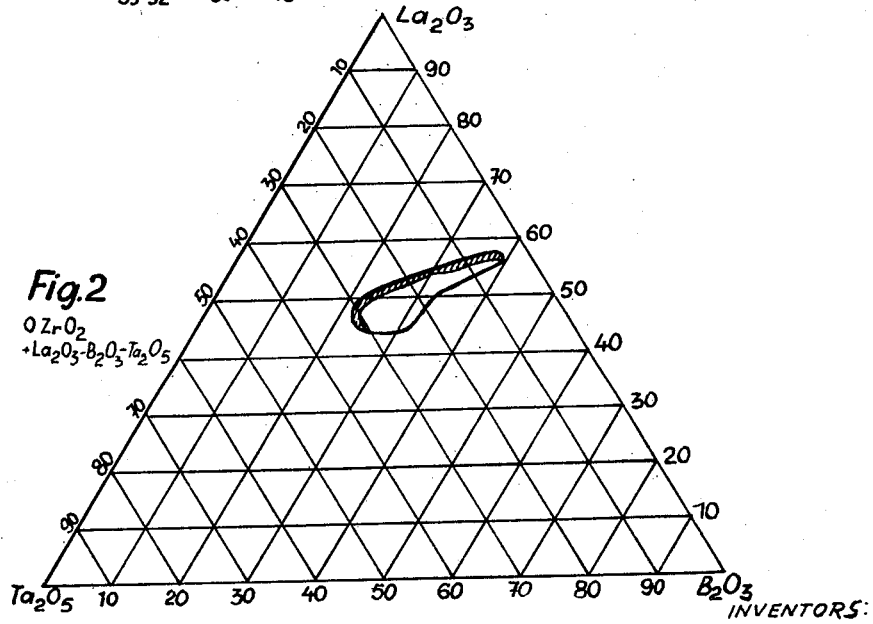

FIGURE 1 shows an $n_d$—$\nu$ diagram in which the optical position of a few known glass compositions and a few compositions according to the present invention is entered; while FIGURES 2 to 4 show three-component diagrams in triangular coordinates of glass compositions according to the invention.

In FIGURE 1 of the drawings, the optical position of the known glass compositions is indicated by means of small crosses and that of the glass compositions according to the invention by means of small circles.

FIGURES 2 to 4 indicate the stable glass range of the four-component systems La₂O₃, Ta₂O₅, ZrO₂, and B₂O₃ as variables, while the zirconium content is shown in each drawing as being constant and amounting in FIGURE 2 to 0%, in FIGURE 3 to 5%, and in FIGURE 4 to 10%. It should be noticed that at a ZrO₂ content of 0%, the stable glass range does not reach the right-side limit of the coordinate system where the Ta₂O₅ content amounts to zero. It is therefore impossible to produce stable glass compositions if the contents of both ZrO₂ and Ta₂O₅ amount to zero. On the contrary, as mentioned in the beginning, such stable compositions require at least a minimum amount of 4% by weight of both ZrO₂ and Ta₂O₅ taken together.

It may be seen from these drawings that, particularly with a ZrO₂ content of 0 to 5%, the range of the other components B₂O₃, La₂O₃, and Ta₂O₅ forms a very narrow strip, which means that, with a given amount of boric acid, the admissible La₂O₃ content can be varied only within very small limits. The above mentioned absolute lower limit of 44–0.04 (ZrO₂) is therefore attainable only in the vicinity of 27% of B₂O₃, as indicated in FIGURES 2 to 4, and must be strictly defined, as will be subsequently explained in greater detail. Since at a constant ZrO₂ content and a given amount of boric acid, the total of La₂O₃ and Ta₂O₅ must likewise be constant, since La₂O₃+Ta₂O₅=100—B₂O₃—ZrO₂, the mentioned requirement of a small variability applies similarly also to Ta₂O₅.

As indicated in FIGURES 2 to 4, the boric acid contents of the glass compositions according to the invention lie between 20 and 40% by weight. The refraction then in effect depends only upon this B₂O₃ content as indicated with considerable accuracy in the following Table III.

*Table III*

| $n_d$ | 1.74 | 1.76 | 1.78 | 1.80 | 1.82 | 1.84 | 1.86 | 1.88 |
|---|---|---|---|---|---|---|---|---|
| B₂O₃, percent | 38.5–40 | 35.5–37 | 32.5–33.5 | 29.5–30.5 | 26–27.5 | 25 | 22.5 | 20 |

The La₂O₃ contents of the glass compositions according to the invention lie between 40 and 60% by weight and the Ta₂O₅ contents amount to 0 to 30% by weight. However, as indicated in FIGURES 2 to 4, the following restrictions apply:

For a ZrO₂ content of 0%, Table IV, line 1 applies;
For a ZrO₂ content of 5%, Table IV, line 2 applies; while
For a ZrO₂ content of 10%, Table IV, line 3 applies.
Intermediate values of ZrO₂ and B₂O₃ are to be graphically interpolated.

Since La₂O₃=100—B₂O₃—ZrO₂—Ta₂O₅, the La₂O₃ contents result from the values as indicated and complied in Table I.

*Table IV*

| ZrO₂ percent by wt. | B₂O₃ | | | | | | | |
|---|---|---|---|---|---|---|---|---|
| | 40 | 37 | 33.5 | 30.5 | 27.5 | 25.0 | 22.5 | 20.0 |
| 0 | | 5.0–8.0 | 10.0–15.0 | 14.5–24.5 | 18.5–28.5 | 22.0–30.0 | 26.0–31.0 | 30.0 |
| 5 | | 0–6.5 | 5.0–13.5 | 10.5–21.0 | 15.0–25.0 | 18.0–26.0 | 21.0–27.0 | 25.0 |
| 10 | 0 | 0–4.5 | 0–11.5 | 4.0–18.0 | 10.0–22.5 | 14.0–25.0 | 18.5–25.5 | 25–26 |

The optical position of the glass compositions according to the invention is very extreme. This is true especially for the area $n_d$=1.75 to 1.80 where very high $\nu$-values are attained, as well as for refractive indices above 1.825, as indicated in FIGURE 1 in which a few examples are marked by circles. In the latter case it is not only possible to produce glass compositions with a refractive index of up to 1.87 and more, but these compositions also have extremely high $\nu$-values relative to such a refraction, as could previously not be attained without any application of thorium.

The best optical positions will be attained if the amount of Ta₂O₅ is held in the vicinity of its lower limit or, which means practically the same, if the lanthanum oxide content is made at least as high as the mean value resulting from Table I. Furthermore, the ZrO₂ content should preferably be made as high as possible; for example, up to about 10% for refractive indices above 1.78.

For refractive indices between 1.74 and 1.78, the upper limit of the zirconium content may be very well expressed by the formula $$ZrO_2 = 5\sqrt{100(n_d - 1.74)}$$

The glass range is limited in FIGURES 2 to 4 toward the higher lanthanum oxide contents by a shaded marginal zone in order to indicate that the glass compositions falling within this zone can be obtained without crystallization only in small units. If the lanthanum oxide content is reduced by only 1 to 2% and replaced by the same amount of Ta₂O₅, the stability will increase so quickly that large glass units or batches will become possible. If, however, the lanthanum oxide content is reduced to a value below the lower limit, a partial phase separation will occur.

Provided that pure raw materials are applied, the glass compositions according to the invention will be colorless up to the highest refractive indices, have great hardness, and a very good chemical stability, especially if the Ta₂O₅ contents are not made too small.

For producing the new glass compositions, the purest possible raw materials La₂O₃, Ta₂O₅, and ZrO₂, preferably in the form of oxides, and boric acid in the form of boric acid hydrate are intimately mixed with each other and melted in portions in a platinum crucible at temperatures of 1300 to 1400° C. The highest temperatures will be required for the composition with the highest content in $Ta_2O_3+ZrO_2$. The refining temperatures should preferably be about 20° higher than the insertion temperatures. The molten mixture is thereafter stirred until it has attained the viscosity necessary for casting, that is, at a temperature between 1000° and 1100° C. Finally, the molten mixture is cast in the usual manner into preheated steel molds and then slowly cooled.

The following Table V shows a few examples of the glass compositions according to the invention.

Table V

| No. | $B_2O_3$ | $La_2O_3$ | $Ta_2O_5$ | $ZrO_2$ | $n_d$ | $\nu$ |
|---|---|---|---|---|---|---|
| 1 | 37 | 55 | 8 | | 1.747 | 51.2 |
| 2 | 37 | 58 | 5 | | 1.747 | 52.1 |
| 3 | 33 | 53 | 14 | | 1.771 | 48.2 |
| 4 | 30 | 53 | 17 | | 1.788 | 46.7 |
| 5 | 25 | 50 | 25 | | 1.827 | 43.4 |
| 6 | 22 | 50 | 28 | | 1.849 | 41.7 |
| 7 | 40 | 55 | | 5 | 1.747 | 52.8 |
| 8 | 37 | 53 | 5 | 5 | 1.754 | 50.5 |
| 9 | 36 | 58 | 1 | 5 | 1.757 | 51.5 |
| 10 | 36 | 59 | | 5 | 1.762 | 50.5 |
| 11 | 35 | 55 | 5 | 5 | 1.766 | 49.8 |
| 12 | 35 | 57 | 3 | 5 | 1.766 | 50.3 |
| 13 | 33 | 56 | 6 | 5 | 1.777 | 49.3 |
| 14 | 30 | 45 | 20 | 5 | 1.798 | 44.3 |
| 15 | 30 | 53 | 12 | 5 | 1.798 | 46.7 |
| 16 | 28 | 52 | 15 | 5 | 1.807 | 45.3 |
| 17 | 23 | 50 | 22 | 5 | 1.850 | 42.2 |
| 18 | 20 | 50 | 25 | 5 | 1.867 | 41.0 |
| 19 | 25 | 50 | 17 | 8 | 1.840 | 42.9 |
| 20 | 35 | 50 | 5 | 10 | 1.774 | 48.3 |
| 21 | 35 | 55 | | 10 | 1.773 | 49.7 |
| 22 | 34 | 56 | | 10 | 1.781 | 49.4 |
| 23 | 33 | 52 | 5 | 10 | 1.787 | 48.1 |
| 24 | 30 | 50 | 10 | 10 | 1.804 | 46.1 |
| 25 | 30 | 55 | 5 | 10 | 1.803 | 47.2 |
| 26 | 25 | 45 | 20 | 10 | 1.836 | 42.8 |
| 27 | 25 | 50 | 15 | 10 | 1.837 | 43.6 |
| 28 | 25 | 51 | 14 | 10 | 1.841 | 43.8 |
| 29 | 23 | 48 | 19 | 10 | 1.853 | 42.4 |
| 30 | 21 | 43 | 26 | 10 | 1.873 | 40.0 |
| 31 | 25 | 45 | 18 | 12 | 1.843 | 42.5 |

Although our invention has been illustrated and described with reference to the preferred embodiments thereof, we wish to have it understood that it is in no way limited to the details of such embodiments, but is capable of numerous modifications within the scope of the appended claims.

Having thus fully disclosed our invention, what we claim is:

1. A thorium oxide free optical glass consisting essentially of, by weight,

| | Percent |
|---|---|
| $B_2O_3$ | 30 |
| $La_2O_3$ | 53 |
| $Ta_2O_5$ | 12 |
| $ZrO_2$ | 5 |

2. A thorium oxide-free optical glass consisting essentially of, by weight,

| | Percent |
|---|---|
| $B_2O_3$ | 33 |
| $La_2O_3$ | 52 |
| $Ta_2O_5$ | 5 |
| $ZrO_2$ | 10 |

3. A thorium oxide free optical glass consisting of the following ingredients in the indicated percentages by weight:

| Ingredients— | Percent by weight |
|---|---|
| $B_2O_3$ | 20–40 |
| $La_2O_3$ | 40–60 |
| $ZrO_2$ | 0–12 |
| $Ta_2O_5$ | 0–31 | said glass including at lease 4% by weight of one of $ZrO_2$, $Ta_2O_5$ and mixtures thereof.

4. A thorium oxide free optical glass consisting of $B_2O_3$, $La_2O_3$, $Ta_2O_5$, and $ZrO_2$, the range of percentage by weight of the ingredients in the glass being as follows:

| Ingredients— | Percent by weight |
|---|---|
| $B_2O_3$ | 20–40 |
| $La_2O_3$ | 40–59 |
| $ZrO_2$ | 0–10 |
| $Ta_2O_5$ | 0–31 | in which, when $ZrO_2$ is present in an amount equal to zero weight percent, the range of percentages by weight of the ingredients in the glass is as follows:

| Ingredients— | Percent by weight |
|---|---|
| $B_2O_3$ | 20–37 |
| $La_2O_3$ | 44–58 |
| $Ta_2O_5$ | 5–31 | when $ZrO_2$ is present in an amount equal to 5% by weight the range of percentage by weight of the ingredients in the glass is as follows:

| Ingredients— | Percent by weight |
|---|---|
| $B_2O_3$ | 20–37 |
| $La_2O_3$ | 43–58 |
| $Ta_2O_5$ | 0–27 | and when $ZrO_2$ is present in an amount equal to 10% by weight the range of percentage by weight of the ingredients in the glass is as follows:

| Ingredients— | Percent by weight |
|---|---|
| $B_2O_3$ | 20–40 |
| $La_2O_3$ | 40–57 |
| $Ta_2O_5$ | 0–27 |

5. A thorium oxide free optical glass according to claim 3 encompassing within the area of the ternary composition diagram of the elements $B_2O_3$, $La_2O_3$ and $Ta_2O_5$ ($ZrO_2$ representing a constant having a value of one of 0, 5, 10, and 12) defined by straight lines joining the following composition points expressed in weight percent:

| $ZrO_2=0$ | | |
|---|---|---|
| $B_2O_3$ | $La_2O_3$ | $Ta_2O_5$ |
| 37 | 55 | 8 |
| 37 | 58 | 5 |
| 33 | 53 | 14 |
| 30 | 53 | 17 |
| 25 | 50 | 25 |
| 22 | 50 | 28 |

| $ZrO_2=5$ | | |
|---|---|---|
| 40 | 55 | ---- |
| 37 | 53 | 5 |
| 36 | 58 | 1 |
| 36 | 59 | ---- |
| 35 | 55 | 5 |
| 35 | 57 | 3 |
| 33 | 56 | 6 |
| 30 | 45 | 20 |
| 30 | 53 | 12 |
| 28 | 52 | 15 |
| 23 | 50 | 22 |
| 20 | 50 | 25 |

| $ZrO_2=10$ | | |
|---|---|---|
| 35 | 50 | 5 |
| 35 | 55 | ---- |
| 34 | 56 | ---- |
| 33 | 52 | 5 |
| 30 | 50 | 10 |
| 30 | 55 | 5 |
| 25 | 45 | 20 |
| 25 | 50 | 15 |
| 25 | 51 | 14 |
| 23 | 48 | 19 |
| 21 | 43 | 26 |

| $ZrO_2=12$ | | |
|---|---|---|
| 25 | 45 | 18 |

References Cited in the file of this patent
UNITED STATES PATENTS

| 2,861,000 | Geffcken et al. | Nov. 18, 1958 |
| 2,866,712 | Weissenberg et al. | Dec. 30, 1958 |
| 2,899,322 | Bromer et al. | Aug. 11, 1959 |
| 3,006,776 | Geffcken | Oct. 31, 1961 |

UNITED STATES PATENT OFFICE
CERTIFICATE OF CORRECTION

Patent No. 3,080,240                                            March 5, 1963

Walter Geffcken et al.

It is hereby certified that error appears in the above numbered patent requiring correction and that the said Letters Patent should read as corrected below.

Column 2, line 29, for "($ZrO_2$)" read -- $(ZrO_2)^2$ --; line 72, for "begining" read -- beginning --; column 3, line 59, for "greated" read -- greater --; column 4, line 12, for "complied" read -- compiled --; column 5, line 65, for "lease" read -- least --.

Signed and sealed this 1st day of October 1963.

(SEAL)
Attest:

ERNEST W. SWIDER                                        DAVID L. LADD
Attesting Officer                                          Commissioner of Patents